United States Patent [19]

Kempkers

[11] Patent Number: 4,958,878

[45] Date of Patent: Sep. 25, 1990

[54] HEADLINER WITH INTEGRAL VISOR

[75] Inventor: Gordon Kempkers, Hamilton, Mich.

[73] Assignee: Prince Corporation, Holland, Mich.

[21] Appl. No.: 396,224

[22] Filed: Aug. 21, 1989

[51] Int. Cl.$^5$ ............................................. B60J 3/00
[52] U.S. Cl. ................................ 296/97.5; 296/214; 296/39.1; 296/97.9
[58] Field of Search ............... 296/214, 39.1, 97.1, 296/97.5, 97.9

[56] References Cited

U.S. PATENT DOCUMENTS

| | | | |
|---|---|---|---|
| Re. 30,861 | 2/1982 | Krawagna | 16/293 |
| 343,867 | 6/1865 | Couch et al. | 296/97 |
| 2,289,644 | 4/1941 | Gano, Jr. | 296/97 |
| 2,829,003 | 4/1956 | Moyes | 296/97 |
| 3,199,913 | 6/1963 | Field et al. | 296/97 |
| 3,447,199 | 4/1966 | Trimble | 16/150 |
| 3,454,301 | 9/1967 | Lehmann | 296/97 |
| 4,023,856 | 5/1977 | DeRees | 296/97 |
| 4,131,702 | 12/1978 | Alfter et al. | 428/76 |
| 4,149,749 | 4/1979 | Canal | 296/97 |
| 4,227,241 | 10/1980 | Marcus | 362/61 |
| 4,256,797 | 3/1981 | Stamper et al. | 428/215 |
| 4,363,513 | 12/1982 | Sahar | 296/140 |
| 4,468,062 | 8/1984 | Marcus et al. | 296/97 |
| 4,491,360 | 1/1985 | Fleming | 296/97 |
| 4,492,404 | 1/1985 | Marcus et al. | 296/97 |
| 4,558,899 | 12/1985 | Chu et al. | 296/97 |
| 4,674,789 | 6/1987 | Watjer et al. | 296/97 |
| 4,738,481 | 4/1988 | Watjer et al. | 296/37 |
| 4,824,160 | 4/1989 | Fleming | 210/74 |

Primary Examiner—Johnny D. Cherry
Assistant Examiner—Joseph D. Pape
Attorney, Agent, or Firm—Price Heneveld Cooper DeWitt & Litton

[57] ABSTRACT

An integral headliner and visor include a headliner body and integrally formed single or multiple panels, which are hinged to the body to define one or more visor shapes. Upholstery material covering the outer surface of the body and panels, form a flexible hinge for the visor to headliner junction. In some embodiments, the panels are separate from the headliner body. In other embodiments an over-center hinge is also employed to couple the panels to the headliner body.

13 Claims, 2 Drawing Sheets

HEADLINER WITH INTEGRAL VISOR

BACKGROUND OF THE PRESENT INVENTION

The present invention pertains to vehicle headliner systems and particularly to a vehicle headliner which integrally includes one or more sun blocking visors.

With modern vehicles assembly methods, it is becoming increasingly important to integrate vehicle subassemblies. The vehicle interior trim is an example of such integration, whereby trim panels, for example, are pre-manufactured to include a variety of accessories. Thus, for example, a vehicle headliner may include integrated dome lights, overhead consoles and visors which have been attached to the headliner prior to the installation of the headliner assembly in the vehicle during the manufacturing of the vehicle. The supplier of the trim piece will typically add various components to a headliner shell prior to shipping to the vehicle manufacturer. Such an assembly can then be readily installed in a vehicle without the need for further preassembly prior to assembly of the headliner into the vehicle.

There exists several visor installations which are adapted to mount to a vehicle headliner, such that the visor extends between the vehicle roof support structure and the headliner itself. Representative of such visor installations are U.S. Pat. Nos. 4,492,404; 4,491,360; 4,824,160 and 4,468,062. Also U.S. Pat. No. 3,343,867 discloses a visor which includes a mounting flap for bolting to a vehicle such that the visor is attached to the vehicle roof support together with the headliner and stores within a recess formed in the headliner. Such construction, again, requires additional subassembly at the automobile manufacturing facility thereby adding to the cost and time of manufacturing vehicles

SUMMARY OF THE PRESENT INVENTION

The headliner system of the present invention overcomes the deficiencies of the prior art by providing a headliner which integrally includes one or more visors and preferably a headliner which snaps within the roof area of a vehicle. Such construction requires no further subassembly by the manufacture of the headliner and visor, inasmuch as the units are manufactured simultaneously. Also, no further subassembly is required by the automotive manufacturer in order to complete the assembly of the headliner and visors to the vehicle.

Headliners embodying the present invention include a substrate or core which can be of any suitable material such as foam polymeric composite material or the like and a resilient exterior skin which is cut in the shape of the vehicle headliner with one or more flaps extending from the body of the headliner shape to define a visor panel. In a preferred embodiment of the invention, the flap and visors so formed, is made of the same substrate material as the headliner and preferably shaped to allow material to be folded for double thickness to define the visor body. The resilient exterior skin in one embodiment can form the hinge for the visor allowing its motion between a raised stored position and a lowered use position. A separate pivot hinge can be incorporated between the main body of the headliner and the visor defining substrate material at the hinge junction.

The resultant structure provides a headliner with one or more visors which has the advantage of being made of the same upholstery material which defines the exterior skin of the headliner and is integrally made at the time of manufacture of the headliner and thus requires no further installation during manufacture of the vehicle.

These and other features, objects and advantages of the present invention will become apparent upon reading the following description thereof together with reference to the accompanying drawings in which:

BRIEF DESCRIPTION OF THE DRAWINGS

FIG. 4 is a cross-sectional view of one of the visors shown in FIG. 1 taken along section line IV-IV of FIG. 1.

DETAILED DESCRIPTION OF THE PREFERRED EMBODIMENT

Figure 1:
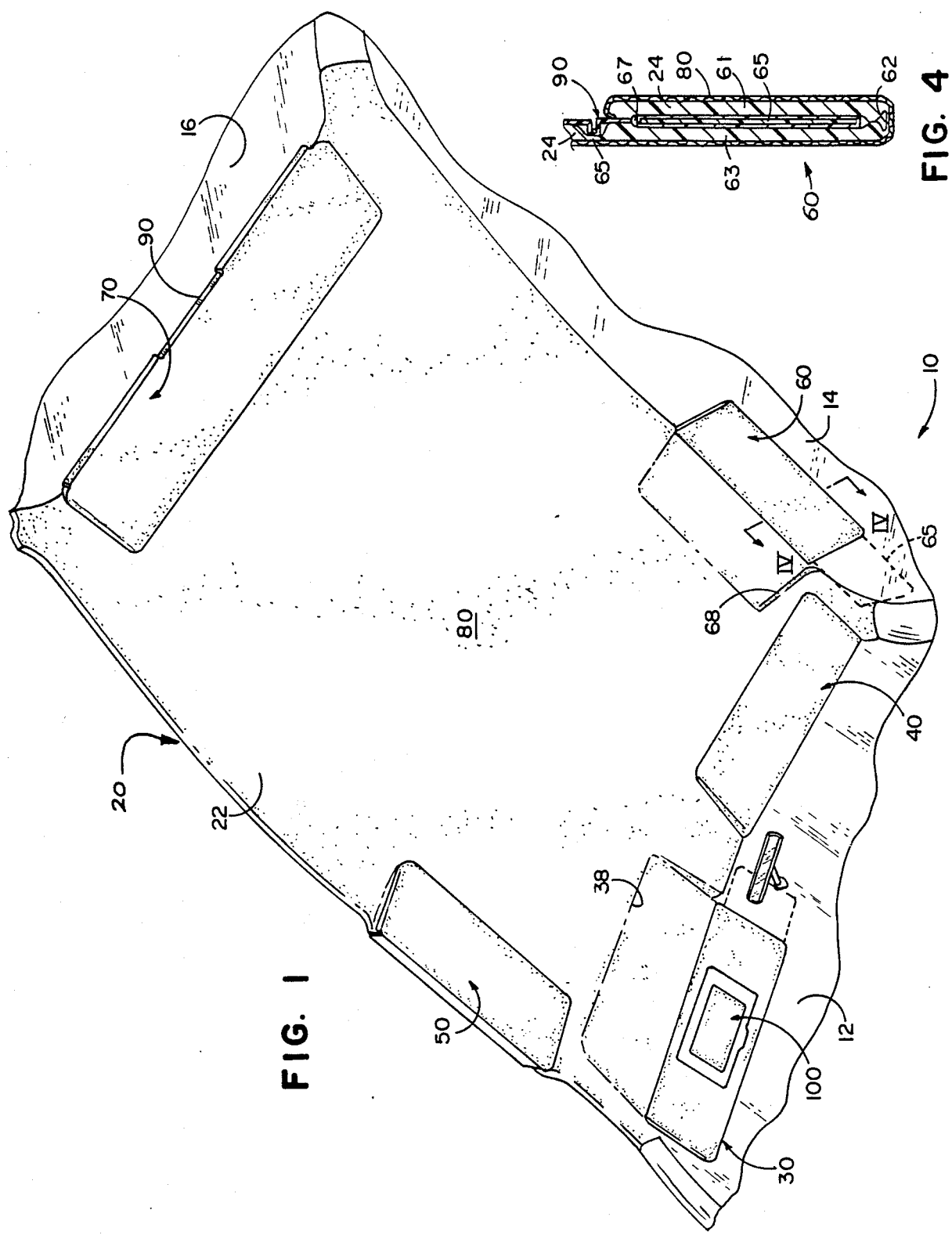
FIG. 1 is a perspective view of a vehicle including a headliner assembly of the present invention, taken in a direction of looking upwardly and forwardly inside the vehicle.

Referring initially to FIG. 1, there is shown a vehicle 10 having a front windshield 12, side windows 14, and a rear window 16. Headliner assembly 20, of the present invention, is shown installed in the vehicle with the headliner containing a body 22 and several integral visors. The embodiment shown in FIG. 1 is representative of the manufacture of a headliner including all the visors for use in the front side and rear window areas of a vehicle Thus, for example, in FIG. 1, the headliner assembly 20 includes a driver side visor 30 shown in a lowered use position a passenger side visor 40, shown in a raised stored position, within a pocket integrally formed in the headliner body 22, a driver's left side window visor 50, shown in a raised stored position, a passenger side window visor 60, shown in a lowered use position and which integrally includes an extender panel 65. Assembly 20 further includes a rear window visor 70 also shown in a raised stored position which can be pivoted downwardly to cover the upper edge of rear window 16.

Figure 2:
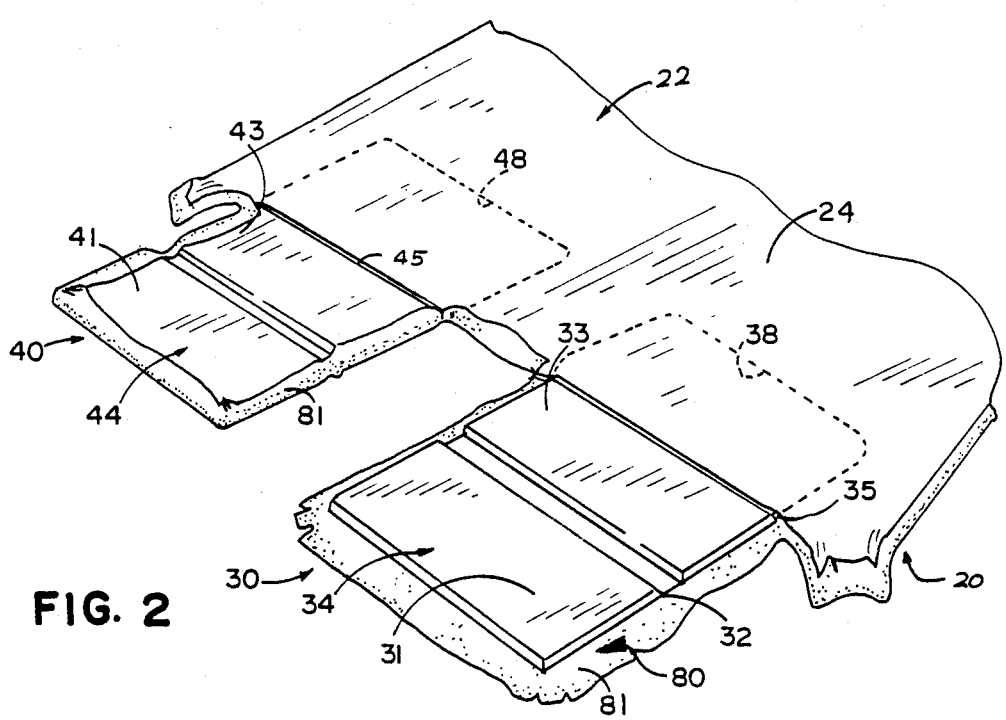
FIG. 2 is a fragmentary perspective view of the headliner system shown in FIG. 1 taken during assembly of the headliner and in a direction above the headliner and looking rearwardly.
Figure 3:
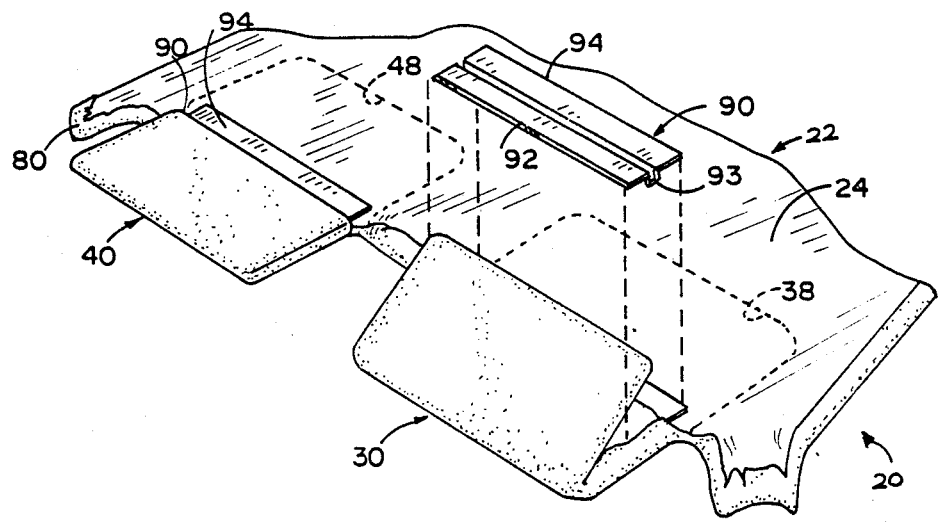
FIG. 3 is a fragmentary perspective view of the structure shown in FIG. 2 with an optional hinge assembly attached thereto and further illustrating the manufacturing process for the structure of the present invention.

The body 22 of headliner 20, as best seen in FIGS. 2-4, is made of a substrate 24, which can be molded in the three dimensional shape of the headliner. Such substrate can be made of any suitable material such as a closed cell polymeric material and can be constructed as disclosed in U.S. patent application entitled HEADLINER CONSTRUCTION, filed on 03/24/89, Ser. No. 328,233, the disclosure of which is incorporated herein by reference. The substrate 24 is molded in the shape of the headliner for a particular vehicle and also includes extensions such as flaps 34 and 44 (FIG. 2) which define, in part, the visors 30 and 40. The substrate 24, formed in the shape of a headliner and including the flaps defining each of the visors 30, 40, 50, 60 and 70; is covered by a resilient exterior skin 80 which in the preferred embodiment is an upholstery fabric. This fabric can be cloth, vinyl, leather or other synthetic resilient material employed for trimming the interior surface of the headliner of the vehicle. Typically, the substrate 24 and fabric 80 will be integrally made during manufacturing such that they are bonded together during the forming process of the headliner shape.

As best seen in FIG. 2, in the preferred embodiment of the invention, each of the flaps defining each of the visors is formed to provide two separate panels such as panels 31 and 33 for visor 30 with a fold line 32 having a section of substrate material 24 thinner than that of panels 31 and 33. Also, panel 33 has at its rearward edge, a second narrowed fold line section 35 which is made of the substrate material 24, again, having a thinner cross-section to allow folding of the panels 31 and 33 together and subsequently pivoting the visor 30 so formed with respect to the main body 22 of the headliner between a lowered use position and a raised stored position. As seen in FIG. 1, the headliner substrate 24 is further formed during its molding to include recesses or pockets such as pocket 38 into which visor 30 is stored and pocket 68 into which visor 60 is stored when in a raised position. The headliner similarly includes an integrally formed pocket for storage of each of the remaining visors therein.

In some embodiments of the present invention, the interface between visor panels such as panel 33 and the main body 22 of headliner assembly 20, may be reinforced by an over-center polymeric hinge 90 (FIGS. 3 and 4) which has flanges 92 and 94 which are bonded to the substrate material 24 by a suitable bonding adhesive or by a heat fusion process. Hinges 90 may be of generally conventional construction and may include an overcenter hinge joint 93 between the flanges 92 and 94 to urge the visors between the stored and use positions as illustrated by visors 30 and 40 in FIG. 1. As best seen in FIGS. 3 and 4, hinge 90, if employed, is concealed under the fabric skin 80 and above the headliner so that it is not visible once the headliner is assembled.

During manufacture of the headliner assembly 20, the panels forming each of the flaps defining a visor, have fabric edges 81 which extend slightly beyond the shape of the panels and which fabric is then tucked around the edge of the panel as illustrated by end visor 40 of FIG. 2, and bonded by a suitable bonding adhesive or other conventional means. The flaps 31 and 33, 41 and 43 are then folded over as illustrated by visor 30 in FIG. 3, with or without a hinge member 90 being preassembled as described above and the facing surfaces of the panels bonded together to complete the visor construction as well as the headliner construction.

Some embodiments of the invention may include additional accessories. Thus, for example, the visor 30 shown in FIG. 1 includes an illuminated vanity mirror package 100 which can be of the type generally described in U.S. Pat. No. 4,227,241. Such vanity mirror package can be added to the visor once manufactured by die cutting through the upholstery and cutting through one of the panels, such as panel 33 of visor 30 to form an aperture for receiving the mirror package. Package 100 can be bonded to the remaining panel 31 of visor flap 34 such that the vanity mirror package is mounted in fixed relationship to the surface of the visor 30 so defined. Similarly, any one or more of the visors may include a sliding extender such as extender 65 associated with visor 60. Extender 65 is a relatively flat polymeric material made of a suitable material such as ABS, polycarbonate, or the like and slides within a pocket 67 which can be integrally molded in the facing surfaces of the visor panels 61 and 63. Visor 60, like visors 30 and 40 and the remaining visors, includes hinge sections 62 and 65 allowing the panels defined thereby to be folded over and bonded as illustrated in FIGS. 1 and 4 to define the visor.

As can be seen, the integral headliner and visor construction of the present invention, provides a headliner which has a smooth and streamlined appearance with the fabric 80 overlying and defining the visors so there are no gaps or breaks between the headliner and the visor but only fold lines of the fabric. This construction provides a neat appearing headliner construction, which is both relatively inexpensive and attractive.

Various modifications to the present invention can be made, as for example, by molding the headliner main body 22 separate from the upholstery covering 80 or adding separate panels 31 and 33 for each of the visor flaps. Naturally, for example, if panel sections 31 and 33, on visor 30 are employed, the core material 24 must be a resilient material, which is capable of several cycles of bending of joint 35, unless an additional hinge such as hinge 90 is employed. These and various other modifications of the preferred embodiments of the present invention can be made by those skilled in the art without departing from the spirit or scope thereof as defined by the appended claims.

The embodiments of the invention in which an exclusive property or privilege is claimed are defined as follows 1. An integral headliner and visor construction comprising:
    a headliner body formed in the shape of a vehicle headliner;
    at least one generally rectangular panel defining a visor and positioned adjacent an edge of the headliner in a location adjacent a vehicle window where the headliner is installed in a vehicle; and
    a flexible integral covering for the exterior surface of said headliner and said panel, to define a flexible joint between said panel and headliner for said visor.

2. The apparatus as defined in claim 1 wherein said body includes a recess for receiving said visor defining panel when said panel is in a raised stored position adjacent said headliner.

3. The apparatus as defined in claim 2 and further including a second panel aligned with said first named panel and wherein said material covers both said first and second panels which are folded together to define said visor.

4. The apparatus as defined in claim 3 wherein said body and said first and second panels are integrally molded of a foam polymeric material.

5. The apparatus as defined in claim 4 and further including hinge means extending between said first named panel and said body.

6. The apparatus as defined in claim 5 wherein said headliner includes a plurality of first and second panels defining a plurality of integral visors with said body.

7. An integral headliner and visor construction comprising:
    a molded headliner body formed in the shape of a vehicle headliner; said body integrally including at least one generally rectangular flap defining a visor adjacent an edge of the headliner; and
    a flexible cover extending over a surface of said headliner and said panel to define a flexible hinge joint between said panel and headliner for said visor.

8. The apparatus as defined in claim 7 and further including a second integrally formed panel adjacent said first named panel and wherein said cover covers both said first and second panels which are folded together to define said visor.

9. The apparatus as defined in claim 8 wherein said body and said first and second panels are integrally molded of a foam polymeric material.

10. The apparatus as defined in claim 9 and further including hinge means extending between said first named panel and said body.

11. The apparatus as defined in claim 10 wherein said hinge means is an over-center hinge.

12. The apparatus as defined in claim 10 wherein said body includes a recess for receiving said visor defining panel when said panel is in a raised stored position adjacent said headliner.

13. The apparatus as defined in claim 12 wherein said headliner includes a plurality of first and second panels defining a plurality of integral visors with said body.

* * * * *